United States Patent Office 2,983,808
Patented May 9, 1961

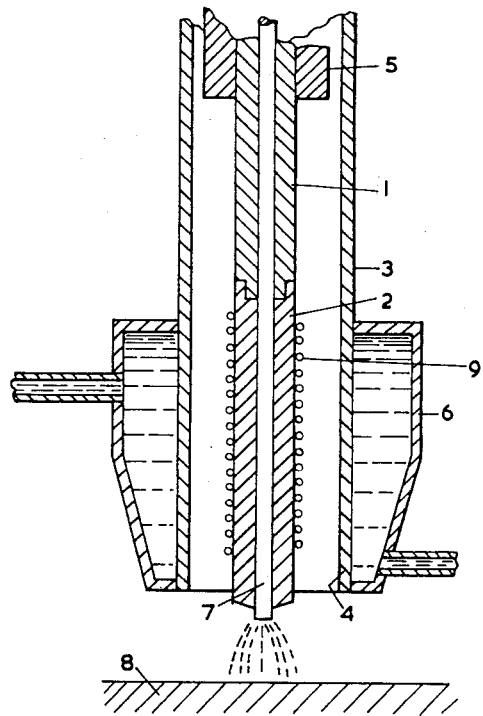

2,983,808
ELECTRIC ARC WELDING
Robert Arthur Cresswell, Tadworth, England, assignor to The British Oxygen Company Limited, a British company Filed Aug. 22, 1958, Ser. No. 756,723
Claims priority, application Great Britain Aug. 22, 1957
2 Claims. (Cl. 219—130)

This invention relates to electric arc welding and in particular to automatic and semi-automatic electric arc welding at high current intensities.

In the welding of steels particularly of heavy section, it is advantageous both technically and economically to achieve high metal deposition rates together with good metallurgical properties.

According to the present invention, in a method of electric arc welding in which an electric arc is established between a workpiece and the tip of a continuous flux coated electrode of the kind having an electrically conductive wire wound around and in electrical contact with a core of the electrode and extending to the surface of the electrode, use is made of the resistance heating effect of the welding current flowing in the electrode to raise the tip of the electrode almost to its melting point. To make use of the resistance heating effect, the extension of the electrode beyond the contact means arranged to conduct welding current to the electrode is made two inches or more, and a welding current density in the electrode of at least 50,000 amperes per square inch is used. Preferably this current density does not exceed 150,000 amperes per square inch.

In conventional electric arc welding with a consumable electrode the distance between the point at which welding current is conducted to the electrode and the tip of the electrode is of the order of one inch to one and a half inches.

A shield of gas or granulated flux may be supplied to protect the electric arc and the welding zone if desired. Guide means may be provided to guide the electrode as it is fed from the contact means.

One construction of welding head for practising the method of the present invention, is illustrated in the accompanying drawing which shows a diagrammatic sectional view of a part of the apparatus including a gas directing nozzle and a tubular metal contact member.

Referring to the drawing, the apparatus includes a tubular metal contact member 1 on the outlet end of which is coaxially mounted a tubular guide 2 of refractory material. The guide 2 must be able to withstand relatively high temperatures and may be formed of refractory materials such as bonded zirconia, sillimanite, mullite, siliconnitride or heat resisting alloys.

The length of the guide will depend on the extension required but will generally not be less than two inches. The contact member 1 and guide 2 are disposed within a tube for feeding shielding gas such as carbon dioxide to the welding zone if desired, and the contact member 1 and a nozzle 4 of the tube 3 are each provided with an encircling passage 5 and 6 respectively to allow for water cooling.

A flux coated electrode 7 is fed through the contact member 1 and tubular guide 2 during the welding operation by conventional feed rolls, not shown, which are driven by an electric motor at substantially constant speed. Welding current is fed to the electrode in known manner as it passes through the contact member 1, an electric arc being established between the tip of the electrode 7 and a workpiece 8.

Alternatively a hopper may be arranged to deposit a layer of flux on the workpiece ahead of the arc in known manner. In this case a gas directing nozzle need not be used.

A construction of continuous flux coated electrode which is especially suitable for the method of the present invention is disclosed in patent specification No. 584,299. Such an electrode consists of a core wire surrounded by and in electrical contact with a wire mesh consisting of an inner layer formed by four parallel wires wound helically about the core wire in a clockwise sense and an outer layer formed by four other parallel wires wound helically about the inner layer in an anti-clockwise sense. The outer layer of wires is in electrical contact with the core wire through the inner layer of wires and extends to the surface of the electrode. The interstices between the wires of the two layers of mesh are filled with a flux coating material. The coating material includes deoxidising and slag forming materials and may contain metal powders such as iron powder.

One electrode which may be used in conjunction with a stream of carbon dioxide flowing around the electrode to deposit a coating of hard facing alloy on a steel workpiece comprises a central core wire of mild steel surrounded by two layers of helically wound wires of smaller diameter than the core wire but also of mild steel. The coating material in the interstices between the helically wound wires comprises a homogeneous mixture of the following principal ingredients:

| | Parts by weight |
|---|---|
| Rutile | 45 |
| Fluorspar | 5 |
| Felspar | 15 |
| High carbon ferro manganese | 16 |
| Other alloying ingredients such for example as ferro-molybdenum and ferro-chromium, up to | 18.5 |

The invention has particular application to the cladding of metal workpieces since it enables the deposition of larger amounts of weld metal for a given heating of the workpiece than is obtained with conventional techniques thereby reducing the dilution of the deposited weld metal by the metal of the workpiece. In cladding mild steel with stainless steel it has been found that by using a longer electrode extension than is conventional the deposition rates can be increased by approximately 100% without increasing dilution. Using a welding current of 400 amperes on a 6 S.W.G. flux coated electrode of the type referred to above a deposition rate of 0.32 lb. per minute of stainless steel was obtained using an electrode extension of 18 inches between the current contact means and the electrode tip.

A coating for an electrode of the type referred to above to produce an electrode capable of depositing a stainless steel of the 18% chromium 8% nickel type under a shield of carbon dioxide comprises a homogeneous mixture of the following principal ingredients:

| | Parts by weight |
|---|---|
| Rutile | 30 |
| Fluorspar | 10 |
| Limestone | 8 |
| Felspar | 5 |
| Ferro-chromium | 22 |
| Nickel powder | 6 |
| Ferro-niobium | 10 |

By the use of the invention, a molten stream of metal may be delivered at high speed to the workpiece, and to prevent blockages through chilling of molten metal in the guide means it may be desirable to commence and finish welding at a value of welding current which is lower than that obtained during normal welding according to the invention. At the commencement of welding this lower value of welding current may be used until the guide means has warmed up and may then be increased continuously or in steps to the higher value. At the end of the welding process the welding current may be reduced continuously or in steps so that solid electrode is passing through the guide means when the flow of welding current is interrupted. The welding current will generally be such as to produce a current density in the electrode of at least 50,000 amperes per square inch. Where necessary, auxiliary heating means such as an electrical resistance heating coil may be arranged to heat the tubular guide 2, especially before welding is commenced.

Although sufficient molten metal may be supplied to fill the weld preparation there may be insufficient heat available using a single electrode to allow full fusion into the workpiece. In such cases a non-consumable electrode preheating arc may be used ahead of the continuous flux coated electrode to maintain a high welding speed. Alternatively more than one flux coated electrode may be used, the leading electrode having welding current conducted to it at the conventional distance from the electrode tip and the following electrode or electrodes having this distance, i.e. the extension, increased to make use of the resistance heating effect and deposit weld metal at an increased rate.

Where two or more electrodes are used they may be spaced at such a distance and may be so directed that the mechanical force on the electrode tips due to the magnetic fields set up by the welding current flowing through the electrodes and the welding arcs assists in guiding the molten or nearly molten weld metal towards the workpiece. Thus, for example, two electrodes having D.C. welding current flowing through them may be arranged parallel to one another so that the mechanical force due to the welding current directs the molten or nearly molten weld metal into a relatively narrow weld pool.

I claim:
1. In a method of welding a metal workpiece in which a continuous flux-coated welding electrode of the kind having an electrically conductive wire around and in electrical contact with a metal core of the electrode and extending to the surface of the electrode is fed past current contact means spaced at least two inches from an electric arc and through heat-resistant insulating guide means to the arc, and in which the welding current density and distance between current contact means and the arc are so correlated that the region of the electrode adjacent its tip is raised almost to its melting point by resistance heating, the improved method of preventing sticking of the electrode in the guide means which comprises heating the guide means before the electric arc is established and the electrode feed is started.

2. Apparatus for use in electric arc welding of a metal workpiece utilising resistance heating of a continuously-fed electrode which includes contact means through which welding current may be conducted to the continuous electrode, heat resistant insulating guide means extending at least two inches along the electrode from the contact means and insulated from the contact means, an electrical resistant heating coil wound around the guide means and arranged to heat the guide means, and means for directing a shield of gas around the guide means, the tip of the electrode, the electric arc, and over the deposited weld metal.

References Cited in the file of this patent
UNITED STATES PATENTS

| | | |
|---|---|---|
| 1,495,272 | Stresau | May 27, 1924 |
| 2,305,206 | Strobel | Dec. 15, 1942 |
| 2,430,701 | Bernard | Nov. 11, 1947 |
| 2,432,048 | Stretton | Dec. 2, 1947 |
| 2,475,835 | Hehenkamp | July 12, 1949 |
| 2,655,586 | Schreiner | Oct. 13, 1953 |
| 2,658,162 | Tichenor et al. | Nov. 3, 1953 |
| 2,669,640 | Outcalt et al. | Feb. 16, 1954 |
| 2,721,249 | Landis et al. | Oct. 18, 1955 |
| 2,736,787 | Welch | Feb. 28, 1956 |
| 2,756,311 | Persson et al. | July 24, 1956 |
| 2,876,330 | Reinhardt | Mar. 3, 1959 |

FOREIGN PATENTS

| | | |
|---|---|---|
| 762,170 | Great Britain | Nov. 21, 1956 |
| 787,910 | Great Britain | Dec. 18, 1957 |